Patented Sept. 6, 1938

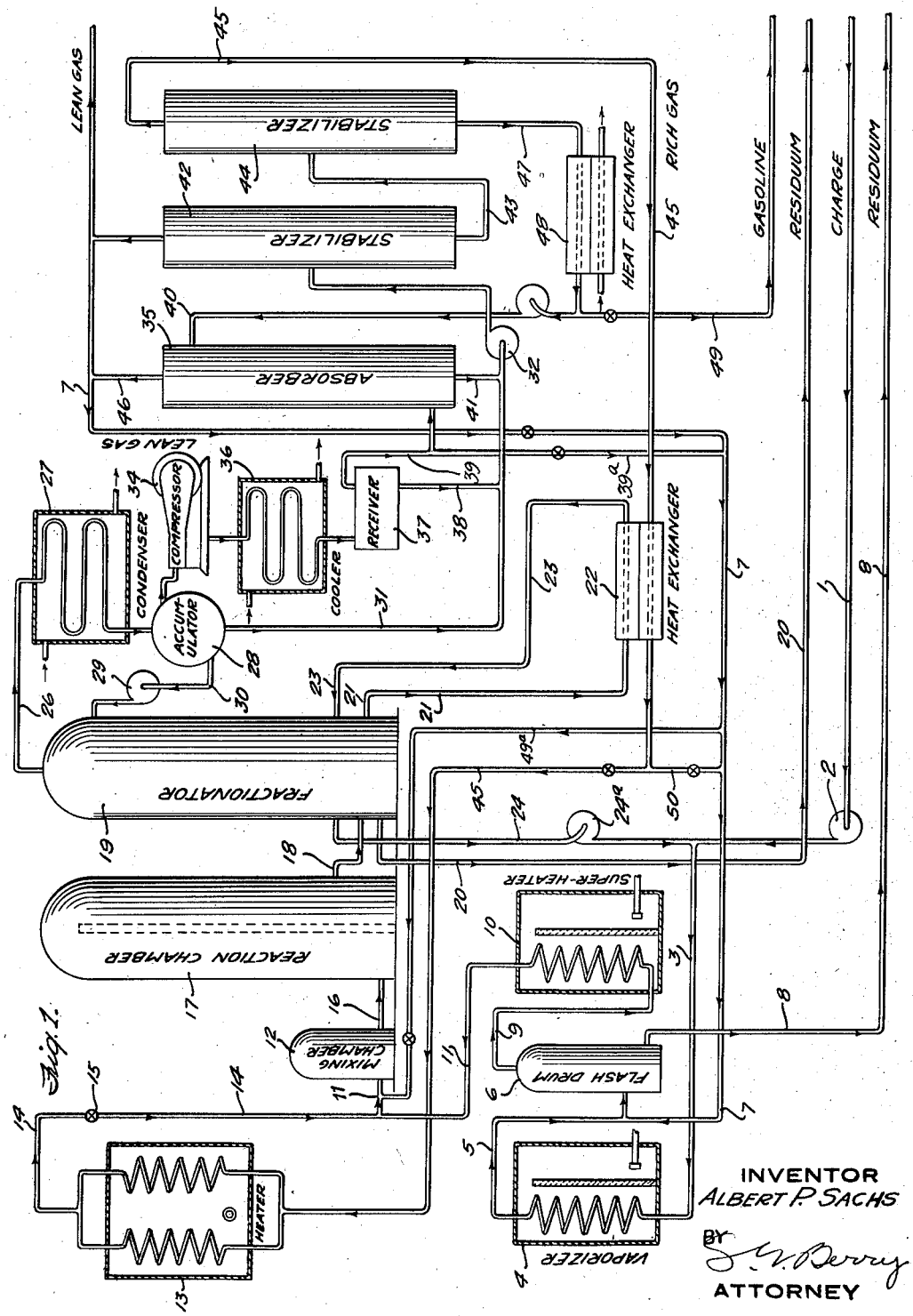

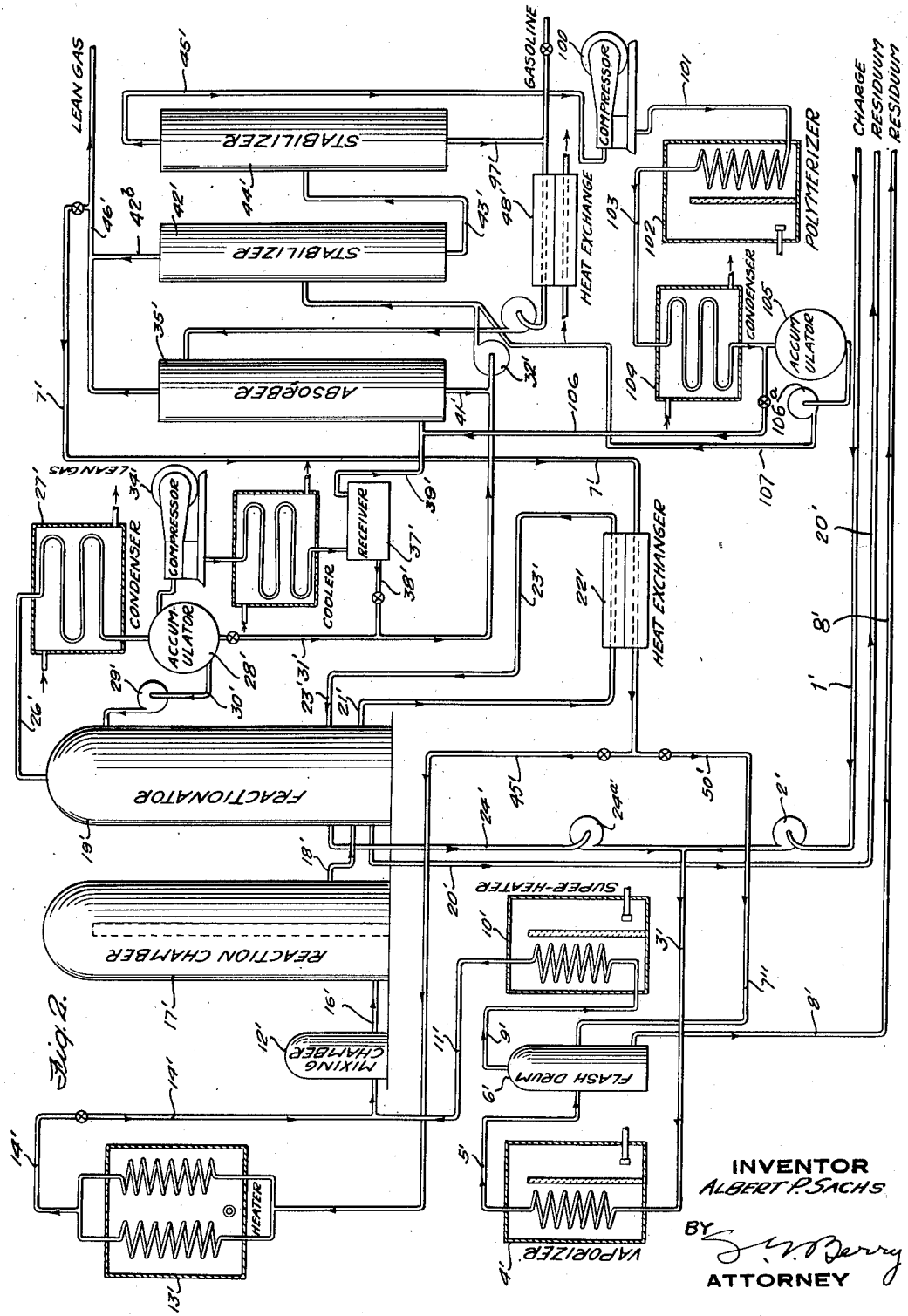

2,129,506

UNITED STATES PATENT OFFICE 2,129,506

METHOD OF HYDROCARBON OIL CONVERSION

Albert P. Sachs, New York, N. Y., assignor to Petroleum Conversion Corporation, New York, N. Y., a corporation of Delaware Application September 28, 1937, Serial No. 166,046

5 Claims. (Cl. 196—10)

My present invention relates to the conversion of hydrocarbon oils into products of the gasoline type. In all types of cracking, especially that which takes place at temperatures in excess of 900° F., there is produced a quantity of gas the utilization of which presents a problem to the industry. The amount of gas produced increases with the increase in cracking temperature, the time remaining constant, and also depends upon the efficiency with which the cracking or conversion operation is carried out. Proposals have been made to utilize this gas, sometimes designated "still" gas, by subjecting it to conditions of polymerization with the production and recovery of liquid compounds having a high octane rating.

In one type of conversion process known to the art as the "TVP" process, conversion is brought about by the agency of a heated heat carrier gas of high specific heat which is admixed with the vapors of the hydrocarbon to be converted. In such case, the gases produced by the cracking reaction are mingled with the heat carrier gas. A portion of this gas is then recycled and again subjected to heating and mixing with the vapors to be converted. While some polymerization occurs during this heating step and the polymerized produce is added to the motor fuel produced, such yield is not large and the excess gas vented from the cracking system contains valuable gaseous polymerizable constituents.

It is accordingly an object of the present invention to increase the yield of polymers in this type of process in a novel and efficient manner.

It is recognized in the art that polymerization is favored by increase of pressure (the temperature remaining constant) and also that an increase of temperature above a certain lever, the pressure remaining constant, hinders polymerization. To a certain degree, therefore, the conditions favorable for polymerization are not those best suited for cracking, where a higher temperature and a lower pressure (especially in the TVP type of process) are favored. If, however, it is impracticable to increase the actual pressure in the polymerization system beyond certain limits, it is possible to increase the effective partial pressure of the polymerizable constituents by increasing their concentration in the gas. My present invention is therefore concerned with an improved method of concentrating the polymerizable constituents which thus increase their effective partial pressure. As relates to this method, I have discovered that it is possible to utilize as an agent for the concentrating of the rich fractions of the gas, the raw gasoline product in such a manner as to stabilize the gasoline in the same operation thereby increasing the efficiency of operation and saving equipment.

Other advantages of the invention and objects to be attained will be apparent from the following description, and the novel features will be pointed out in the appended claims.

In the TVP type of conversion process it is not at present practicable to increase the system pressure beyond that which is usual in the art, e. g., 50 to 150 pounds gage, nor is it possible to heat the heat carrier gas to temperatures lower than those required by the main reaction of cracking, which is, say, from 950 to 1050° F. or higher. Therefore, in carrying out my improved method, after the main portion of the gasoline is condensed out, I preferably step up the pressure of the residual gas (which contains various low boiling hydrocarbon fractions including pentanes, pentenes, butanes and butenes down to and including methane together with a substantial amount of hydrogen) say, to 300 pounds per square inch more or less, thereby to promote stripping by the absorption menstruum from the gas of the fractions valuable either as constituents of the gasoline or as polymerizable constituents, i. e., so as to include in the rich menstruum substantially all of the $C_3$ components and exclude hydrogen, methane and ethane. The gas under this increased pressure is then passed to an absorber which, however, utilizes as the absorption menstruum stabilized raw gasoline. Here the absorption menstruum dissolves out of the gaseous mixture various light hydrocarbons so that the gas after the absorption or stripping operation will be lean, i. e., composed substantially of hydrogen, methane and ethane, while the absorbed gases will consist of the $C_3$ compounds and heavier together with a smaller quantity of ethane, methane and hydrogen which will be unavoidably dissolved in the manstruum. The rich manstruum is now passed together with the previously mentioned condensed main portion of the gasoline to what may be termed the first stabilizer in which the contained lean gases, i. e., ethane, methane and hydrogen, are released by the application of heat. Following this, the menstruum passes to the second stabilizer wherein a lower pressure and/or higher temperature prevails whereby the rich fractions to be used for polymerization, i. e., the $C_3$ and $C_4$ fractions, are driven off and passed to the polymerizer-cycle gas heater. It will be noted that in the process of concentrating the polymerizable constituents the gasoline has likewise been stabilized, such stabilized gasoline being removed from the second stabilizer and delivered from the system, a portion being returned to the absorber as absorption menstruum. Having thus concentrated the rich polymerizable fractions, they may now either be passed to the cycle gas heater where under the conditions there prevailing they will be polymerized and the products of such reaction still in gaseous or vaporous condition utilized as the heat carrier for conversion of additional quantities of hydrocarbon, or polymerization of the rich fractions may be carried out in a separate heater and the lean gas sent back to the cycle gas heater to constitute the heat carrier gas.

In the former case the amount of polymerizable constituents fed to the cycle gas heater may not be sufficient for the oil cracking cycle, in which case preferably additional heated gas is added to the hydrocarbon oil vapors to be cracked at a point after the vaporizer but before the superheater is traversed, so that both the additional gas so added and the vapor are heated in the same unit, while the effective partial pressure of the polymerizable gas is not lowered by admixture with this lean gas. Alternatively, such additional gas may be gas which has not been denuded in the absorber but is withdrawn from the recovery cycle before it enters the absorber, and thus the cost of absorption of this part of the gas is avoided.

The invention will be best understood by reference to the following detailed description taken with the annexed drawings in which Fig. 1 shows schematically an illustrative embodiment in which the rich gas is polymerized in the cycle gas heater, while Fig. 2 shows a further embodiment in which the polymerization is carried out in a separate heater.

The charging stock is supplied to the system through line 1 in which it is picked up by pump 2 and forced under pressure to vaporizer feed line 3. Combined with this fresh charge is a certain amount of recycle charge from fractionator 19 (to be referred to hereinafter) which is picked up by pump 24a from line 24 and mingled with the fresh charge in line 3 to constitute the total vaporizing charge. Pipe 3 passes the combined charge to vaporizer 4, the overhead products leaving the vaporizer through pipe 5, passing to flash drum 6 wherein vapors are released, aided by the action of gas fed thereinto through pipe 7. Gas in pipe 7 may be heated by means not shown in furnace 4, 10, or 13. Blowdown or heavy liquid discharge leaves the flash drum by line 8 to be discharged either from the system as fuel oil residuum or returned by means not shown to the fractionator so that any crackable stock therein may be returned to the vaporizer as recycle stock. The vapor leaving the flash drum 6 passes through line 9 to superheater 10 wherein the vapors are superheated to a point within the vapor phase cracking range, but the rapidity of heating is such as to occasion no substantial amount of cracking in the superheater coil. The hot vapor passes from the superheater through pipe 11 to the mixing chamber 12. Here it is mingled with the hot products from the cycle gas heater-polymerizer 13, such products leaving the heater through pipe 14 having valve 15 therein. If desired, the mixing chamber 12 may be omitted and the pipe 16 relied upon to accomplish the mixing of the gas and vapor. The gaseous heat carrier delivered by pipe 14 is thoroughly mingled with the hot vapor in the mixing chamber 12, and the mixture is withdrawn from such chamber through pipe 16 and introduced into reaction chamber 17. The reaction having gone to the desired point of completion in the reaction chamber 17, the products are withdrawn therefrom through pipe 18 and passed to the fractionator 19 where the products are subjected to fractional condensation. The fractions condensed include a heavy residue withdrawn through pipe 20, a lighter compound, say, of the boiling range of gas oil being withdrawn through pipe 21, cooled in the heat exchanger 22 and returned to the fractionator through pipe 23. Also, a portion of this fraction may be led off through pipe 24 having therein pump 24a, as mentioned, by which it is fed to vaporizer 4.

Overhead products leave the fractionator 19 through pipe 26 and are condensed in condenser 27 which suffices to separate out nearly all the products within the gasoline range which are collected in the accumulator 28, a portion thereof being pumped by pump 29 in pipe 30 as reflux back into fractionator 19. The remainder of the condensate collected in accumulator 28 passes by line 31 and pump 32 to stabilizer 42. The remaining uncondensed products in accumulator 28, which comprise the gas and various vapors, are then preferably compressed by means of compressor 34 to a pressure facilitating a thorough stripping out in absorber 35 of the products boiling above substantially the boiling point of ethane, such pressure desirably ranging from 150 to 350 pounds per square inch gage or higher, (the pressure of the gas fed to the compressor usually varying from 50 to 100 pounds gage) and the compressed products are cooled in the cooler 36, the resulting liquid contents, if any, being caught in receiver 37 and passed by line 38 to line 31 and thence to stabilizer 42, the flow being controlled by means not shown. The cool compressed gas then passes through pipe 39 to absorber 35 through which menstruum comprised preferably of the stabilized gasoline derived from stabilizer 44 is circulated, the same being supplied through pipes 40 and 41. The enriched gasoline menstruum leaves the absorber through pipe 41 and is pumped together with the main gasoline condensate by pump 32 into stabilizer 42, the stabilizer 42 acting to boil off under pressure in gaseous form as overhead the light absorbed gases and vapors such as hydrogen, methane and ethane, etc., but leaving all of the $C_3$ hydrocarbons and heavier in the liquid bottoms or partially stripped mentsruum. This menstruum now leaves the stabilizer 42 through pipe 43 and passes to the second stabilizer 44 which is operated at somewhat higher temperature and/or lower pressure to boil off the remaining products picked up in the absorber 35 or condensed originally with the main gasoline condensate including the propane, propene, butanes, butenes, and part of the isopentane and pentanes, pentenes, etc., which vapors are now sent through pipe 45 through heat exchanger 22 to cycle gas heater-polymerizer 13, whose operation has already been described. The lean gas leaves the absorber through pipe 46. The hot stripped mentsruum, which being stabilized gasoline, is the main product of the system, leaves stabilizer 44 through pipe 47 through which it pases to heat exchanger 48 wherein it is cooled, a portion thereof leaving the system through pipe 49, and a portion being sent back to the absorber as absorption menstruum through pipe 40 as already mentioned.

As previously mentioned, the quantity of hydrocarbons between ethane and stabilized gasoline may be less than the amount of gas needed to act as a heat carrier, and it is therefore desirable to provide for supplementing this supply of gas, and for the purpose a portion of the lean gas from the pipe 46 may be passed through pipe 7 and preferably after being heated by means not shown, is added to the stream of products destined for the reaction chamber adjacent the flash drum 6 as shown. Preferably this gas is added to the oil vapor mixture entering the flash drum 6 where such gas facilitates the vaporization of the oil admitted to said drum, all as previously explained. Instead of using gas supplied from pipe 46, gas from pipe 39, passed through pipe 39a, may be used which has not been passed through the absorber. Alternatively, gas from line 7 may be used to temper the hot gas from the heater 13 where the exit temperature or the total available heat in the gas from said heater is too high for the cracking conditions desired, in which case it passes from line 7 to line 49a and thence to line 11 adjacent the mixing chamber 12, the flow being controlled by valves which need not be described. Lean gas may also be admitted to heater 13 by means of valved pipe 50 connecting line 7 and pipe 45. The gas added to line 5 from vaporizer 4 through line 7 serves to facilitate the heating and subsequent cracking of the vapor. This is because the presence of the gas, first of all, acts as a diluent to prevent destructive cracking during the superheating step and furthermore acts as a so-called mass effect gas to furnish heat units in the reaction chamber. As previously indicated, it is possible, however, to add some makeup gas (preferably separately heated by means not shown) to the heater 13, but since such added gas will dilute the vapors undergoing polymerization, this manner of operation is not preferred.

The products are heated in the heater 13 at temperatures which may vary from, say 950 to 1200° F. or higher, and polymerize both in the heater and also in the mixing chamber 12 and in the reaction chamber 17 and the polymerized products are thereby added to the condensate contained in the accumulator 28 which is stabilized as already described. It will be understood that the pressure in the oil conversion system will ordinarily be less than the pressure obtaining in the polymerizing system including the heater 13 in which the pressure will be a few pounds below that prevailing at the outlet of compressor 34 due to friction losses. This, however, presents no operating difficulty as it is merely necessary to have a pressure reducing valve, as for example 15, in line 14 leading from the heater 13 to the mixing chamber 12.

Fig. 2 illustrates a hookup of apparatus suitable for carrying out the process when polymerization occurs in an apparatus separate from the cycle gas heater. In this figure similar apparatus is marked with the same reference character as in Fig. 1 except that a prime mark is added. In this arrangement, lean gas from stabilizer 42' is led through pipe 42b to pipe 46' which also collects the lean gas from the absorber 35'. A sufficient quantity of the lean gas is then returned through pipe 7' through heat exchanger 22' to heater 13' where it is heated to the requisite temperature, e. g., from 1100 to 1200° F. or higher and then passed by way of pipe 14' to mixing chamber 12' where it meets the superheated vapor from pipe 11', the mixture entering reaction chamber 17'. A portion of the gas from line 7' is also passed by line 7" and after suitable heating by means not shown, to flash drum 6' to facilitate vaporization of the oil therein. The rich gas leaves stabilizer 44' through pipe 45' by which it passes to compressor 100 and thence by way of pipe 101 to polymerizer coil 102. The hot gaseous products leave the polymerizer coil 102 by pipe 103 through which they pass to condenser 104, the condensed products being caught in accumulator 105, while the uncondenser products continue by way of pipe 106 to the absorber 35'. The polymerized distillate collected in accumulator 105 is picked up by a pump 106a and pumped through line 107 to stabilizer 42'.

It will be noted, as in the case of Fig. 1, that the raw gasoline from accumulator 28' and receiver 37' is collected by pipes 31', 38' and passed to the stabilizer 42'. It will be further noted that the gas from receiver 37' and the gas from accumulator 105, containing some rich fractions, is pased by lines 39' and 106, respectively, to the absorber 35' wherein the rich fractions of the gas are recovered. The compressor 100 may boost the pressure to any value desired or required by the polymerizer 102. Since, however, the products are already compressed to, say, 300 pounds by compressor 34', comparatively little energy will be needed to be expended by the compressor 100, provided the pressure in polymerizer 102 is not more than a small multiple of 300 pounds.

As regards both illustrated forms of the invention, it will be noted that the methods disclosed are particularly adapted to the type of process such as the so-called TVP, wherein the polymerizable fractions produced bear a rather small proportion to the total amount of oil cracked. Considering the arrangement according to Fig. 1, for example, no matter how small they are, the polymerized fractions can be treated at very slight additional cost in the heater 13. Where, however, economic conditions justify the greater cost, a separate polymerizer unit may be installed as in the case of the arrangement according to Fig. 2, in which case, however, the gasoline is stabilized during the operation of fractionation of the gas; and, moreover, the polymerizable constituents escaping condensation in the condenser 104 are recovered in the same absorber 35' as suffices for the main cracking system.

Various departures from the detailed disclosure above given will occur to those skilled in the art, without, however, departing from the spirit of my invention or the scope of the appended claims.

I claim:

1. In a system of converting hydrocarbon oils in which the oil to be converted is first vaporized and the final conversion brought about by admixing the vapor with a heat carrier comprising hot gas of the type produced in the conversion system, the method of enriching the gasoline produced by polymerization of gaseous hydrocarbons containing $C_3$, $C_4$, $C_5$ compounds principally, which consists in recovering crude gasoline from the products of the reaction by condensation, leaving a residual gas with which are admixed vapors of fractions boiling below the gasoline range, subjecting the gaseous mixture to the action of an at least partially stabilized gasoline menstruum in an absorber under pressure conditions enabling said menstruum to dissolve a substantial quantity of the rich $C_3$, $C_4$, $C_5$ fractions, withdrawing the enriched menstruum from the absorber, passing it to a first stabilizer of a stabilizing system wherein lean gas which was dissolved along with the rich fractions is released, then to a second stabilizer of said system last mentioned wherein said rich fractions are released, heating said rich gaseous fractions in excess of 1,000° F. thereby causing polymerization of the polymerizable constituents, and utilizing said heated polymerized gas as said heat carrier for the conversion of fresh quantities of hydrocarbons by admixture with the vapors thereof, passing the produced crude gasoline to said stabilizer system to stabilize same, and withdrawing from said stabilizer system some of the gasoline stabilized therein and returning same to said absorber to constitute the absorption menstruum and delivering from said stabilizer system stabilized gasoline as a main product of the hydrocarbon conversion system.

2. In a system of converting hydrocarbon oils in which the oil to be converted is first vaporized, superheated and the final conversion brought about by admixing the vapor with a heat carrier comprising hot gas of the type produced in the conversion system, the method of enriching the gasoline produced by polymerization of gaseous hydrocarbons containing $C_3$, $C_4$, $C_5$ compounds principally, which consists in recovering crude gasoline from the products of the reaction by condensation, leaving a residual gas with which are admixed vapors of fractions boiling below the gasoline range, subjecting the gaseous mixture to the action of a gasoline menstruum in an absorber under pressure conditions enabling said menstruum to dissolve a substantial quantity of the rich $C_3$, $C_4$, $C_5$ fractions, withdrawing the enriched menstruum from the absorber, passing it to a first stabilizer wherein lean gas which was dissolved along with the rich fractions is released, then to a second stabilizer wherein said rich fractions are released, heating said rich gaseous fractions in excess of 1,000° F. thereby causing polymerization of the polymerizable constituents, and utilizing said heated polymerized gas as the heat carrier for the conversion of fresh quantities of hydrocarbons by admixture with the vapors thereof, also returning relatively leaner gas to the conversion system and adding same to the vapor to be converted at a point prior to the final heating of same, passing the produced crude gasoline to said stabilizer system to stabilize same, and withdrawing from said stabilizer system some of the gasoline stabilized therein and returning same to said absorber to constitute the absorption menstruum and delivering from said stabilizer system stabilized gasoline as a main product of the hydrocarbon conversion system.

3. In a system of converting hydrocarbon oils in which the oil to be converted is first vaporized and the final conversion brought about by admixing the vapor with a heat carrier comprising hot gas of the type produced in the conversion system, the method of enriching the gasoline produced by polymerization of gaseous hydrocarbons containing $C_3$, $C_4$, $C_5$ compounds principally, which consists in recovering crude gasoline from the products of the reaction by condensation, leaving a residual gas with which are admixed vapors of fractions boiling below the gasoline range, subjecting the gaseous mixture to the action of a gasoline menstruum in an absorber under pressure conditions enabling said menstruum to dissolve a substantially quantity of the rich $C_3$, $C_4$, $C_5$ fractions, withdrawing the enriched menstruum from the absorber, passing it to a first stabilizer wherein lean gas which was dissolved along with the rich fractions is released, then to a second stabilizer wherein said rich fractions are released, heating said rich gaseous fractions in excess of 1,000° F. thereby causing polymerization of the polymerizable constituents, and utilizing said heated polymerized gas as the heat carrier for the conversion of fresh quantities of hydrocarbons by admixture with the vapors thereof, diverting a portion of the residual gas before the same is passed to the absorber, heating same and utilizing the heated gas to supplement said heated polymerized gas in the conversion of fresh quantities of hydrocarbons, passing the produced crude gasoline to said stabilizer system to stabilize same, and withdrawing from said stabilizer system some of the gasoline stabilized therein and returning same to said absorber to constitute the absorption menstruum and delivering from said stabilizer system stabilized gasoline as a main product of the hydrocarbon conversion system.

4. The method according to claim 1, in which relatively lean residual gas is used to supplement the supply of heat carrier gas available for the conversion of said fresh quantities of hydrocarbons, by adding said lean gas at a lower temperature to said heated polymerized gas whereby said lean gas acts to temper said heated polymerized gas prior to admixing same with said fresh quantities of hydrocarbon vapors.

5. The method according to claim 1 in which the crude produced gasoline is admitted to the stabilizer system by way of the first stabilizer.

ALBERT P. SACHS.